(12) United States Patent
Handshaw et al.

(10) Patent No.: US 12,327,161 B2
(45) Date of Patent: Jun. 10, 2025

(54) SYSTEMS AND METHODS FOR DECODING INDICIA PAYLOAD WITHIN A SCAN VOLUME

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 59 days.

(21) Appl. No.: 18/140,600

(22) Filed: Apr. 27, 2023

(65) Prior Publication Data

US 2024/0362439 A1 Oct. 31, 2024

(51) Int. Cl.
*G06K 7/10* (2006.01)
*G06K 7/14* (2006.01)
*G06T 7/70* (2017.01)
*G06T 15/00* (2011.01)

(52) U.S. Cl.
CPC ....... *G06K 7/10722* (2013.01); *G06K 7/1413* (2013.01); *G06T 7/70* (2017.01); *G06T 15/00* (2013.01); *G06T 2207/20132* (2013.01)

(58) Field of Classification Search
CPC .................................. G06K 7/10722
USPC ................................. 235/462.41
See application file for complete search history.

(56) References Cited

U.S. PATENT DOCUMENTS

| | | |
|---|---|---|
| 2007/0080228 A1 | 4/2007 | Knowles et al. |
| 2017/0300734 A1 | 10/2017 | Zheng et al. |
| 2020/0202088 A1 | 6/2020 | Laffargue et al. |
| 2021/0374373 A1* | 12/2021 | Astvatsaturov ........ G06V 10/82 |

OTHER PUBLICATIONS

International Search Report and Written Opinion for International Patent Application No. PCT/US2024/026071 mailed on Aug. 20, 2024.

* cited by examiner

*Primary Examiner* — Toan C Ly
(74) *Attorney, Agent, or Firm* — Yuri Astvatsaturov

(57) ABSTRACT

Systems and methods for adjusting scan volume are provided. An example includes an indicia reading system comprising a two-dimensional (2D) imaging assembly having at least one 2D imaging sensor and operable to capture 2D image data over at least one 2D field of view (FOV); a three-dimensional (3D) imaging assembly having at least one depth sensor and operable to capture depth data over at least one 3D FOV; and a processor configured to: perform a decoding operation on an indicia appearing in the 2D image data and transmit a payload of the indicia to a host when (i) the indicia is captured in the 2D image data and (ii) at least one of the indicia or an object bearing the indicia is positioned within a 3D scan volume.

16 Claims, 9 Drawing Sheets

SYSTEMS AND METHODS FOR DECODING INDICIA PAYLOAD WITHIN A SCAN VOLUME

BACKGROUND

Indicia reading systems, such as handheld and bi-optic barcode readers or machine vision systems used in retail and warehouse environments, typically capture two-dimensional (2D) images which are used to identify indicia and conduct decoding operations on identified indicia. In a retail environment, such as a self-checkout counter at a grocery store, an indicia reading system may have limited counterspace. This limited space may result in the system reading the indicia twice as the user presents the product to the system and moves it to a bagging area. This may result in the customer being wrongly charged twice for the product or the customer seeking help from a store employee to clear the erroneous scan, all of which increases checkout times. Additionally, indicia reading systems utilizing a wide field of view may also encounter such duplicate reading. Accordingly, there is a need for an indicia reading system and method that overcomes these challenges.

SUMMARY

Systems and methods for decoding indicia within a scan volume are provided. In an embodiment, the present invention is an indicia reading system comprises a two-dimensional (2D) imaging assembly having at least one 2D imaging sensor and operable to capture 2D image data over at least one 2D field of view (FOV). The indicia reading system further comprises a three-dimensional (3D) imaging assembly having at least one depth sensor and operable to capture depth data over at least one 3D FOV. The indicia reading system further comprises a processor configured to perform a decoding operation on an indicia appearing in the 2D image data and transmit a payload of the indicia to a host when the indicia is captured in the 2D image data and at least one of the indicia or an object bearing the indicia is positioned within a 3D scan volume.

In a variation of this embodiment, the processor is further configured to at least one of abstain from performing at least one task associated with the decoding operation or abstain from transmitting the payload of the indicia to the host when (i) the indicia is captured in the 2D image data and (ii) at least one of the indicia or the object bearing the indicia is positioned outside the 3D scan volume.

In another variation of this embodiment, the decoding operation includes at least one of (i) processing the 2D data including the indicia through an indicia finder module, (ii) processing the 2D data including the indicia through a decoder module, or (iii) generating a successful-decode alert signal.

In another variation of this embodiment, the processor is further configured to determine if the object is positioned within the 3D scan volume and, responsive to the object being positioned within the 3D scan volume, transmitting the 2D image data to a decode module.

In another variation of this embodiment, the processor is further configured to, responsive to the object being positioned outside the 3D scan volume, of at least one of (i) abstain from performing at least one task associated with the decoding operation, (ii) abstain from transmitting the payload of the indicia to the host, (iii) cropping the 2D image to exclude at least a portion of the object, (iv) transmit the payload of the indicia to the host with a flag, or (v) process the 2D image data capturing the object with an instruction to ignore a subset of the 2D image data containing at least one of the object or the indicia.

In another variation of this embodiment, the processor is further configured to, responsive to the indicia being decoded when positioned outside of the 3D scan volume and not when positioned within the 3D scan volume, abstaining from transmitting the payload data of the indicia to the host.

In another variation of this embodiment, the processor is further configured to, responsive to the indicia being decoded when positioned outside of the 3D scan volume and also being decoded when positioned within the 3D scan volume, transmit one instance of the payload data of the indicia to the host.

In another variation of this embodiment, responsive to the indicia being decoded when positioned outside of the 3D scan volume and also being decoded when positioned within the 3D scan volume, the processor is configured to perform at least one of (i) cropping the 2D image data capturing the object bearing the indicia as it moves or remains stationary within the 3d scan volume, (ii) indicating to an indicia finder module to ignore 2D image data associated with the object when processing 2D image data capturing the object, or (iii) indicate to the decode module to ignore the 2D image data associated with the object when processing 2D image data capturing the object.

In another variation of this embodiment, the indicia reading system further comprises a housing configured to be positioned on a workstation having a surface extending along a surface plane such that at least a portion of the housing extends above the surface. A central imaging axis of at least one of the at least one of the 2D FOV extends between parallel and 45 degrees relative to the surface plane, and a central imaging axis of the at least one of the at least one of the 3D FOV extends between parallel and 45 degrees relative to the surface plane. Also, a lateral extent of the 3D FOV is less than a lateral extent of the 2D FOV.

In another variation of this embodiment, the decoding operation includes selecting an operating mode that defines the 3D scan volume.

In another variation of this embodiment, the 3D scan volume is a portion of the 3D FOV that is defined by a predefined overlapping portion of the 2D FOV and at least one depth value.

In another embodiment, the present invention is a method for reading indicia comprising capturing 2D image data over at least one 2D field of view (FOV) using a two-dimensional (2D) imaging assembly having at least one 2D imaging sensor. The method further comprises capturing depth data over at least one 3D FOV using a three-dimensional (3D) imaging assembly having at least one depth sensor. The method further comprises performing a decoding operation on an indicia appearing in the 2D image data and transmitting a payload of the indicia to a host when (i) the indicia is captured in the 2D image data and (ii) at least one of the indicia or an object bearing the indicia is positioned within a 3D scan volume, wherein the 3D scan volume is a portion of the 3D FOV that is defined by a predefined overlapping portion of the 2D FOV and at least one depth value.

In a variation of this embodiment, the method further comprises, at least one of abstaining from performing at least one task associated with the decoding operation or abstaining from transmitting the payload of the indicia to the host when (i) the indicia is captured in the 2D image data and (ii) at least one of the indicia or the object bearing the indicia is positioned outside the 3D scan volume.

In another variation of this embodiment, the method further comprises the decoding operation including at least one of (i) processing the 2D data including the indicia through an indicia finder module, (ii) processing the 2D data including the indicia through a decode module, or (iii) generating a successful-decode alert signal.

In another variation of this embodiment, the method further comprises determining if the object is positioned within the 3D scan volume and, responsive to the object being positioned within the 3D scan volume, transmitting the 2D image data to a decode module.

In another variation of this embodiment, the method further comprises, responsive to determining the object is positioned outside the 3D scan volume, at least one of (i) abstaining from performing at least one task associated with the decoding operation, (ii) abstaining from transmitting the payload of the indicia to the host, (iii) cropping the 2D image to exclude at least a portion of the object, (iv) transmitting the payload of the indicia to the host with a flag, or (v) processing the 2D image data capturing the object with an instruction to ignore a subset of the 2D image data containing at least one of the object or the indicia.

In another variation of this embodiment, the method further comprises, responsive to the indicia being decoded when positioned outside of the 3D scan volume and not when positioned within the 3D scan volume, abstaining from transmitting the payload data of the indicia to the host.

In another variation of this embodiment, the method further comprises, responsive to the indicia being decoded when positioned outside of the 3D scan volume and also being decoded when positioned within the 3D scan volume, transmitting one instance of the payload data of the indicia to the host.

In another variation of this embodiment, the method further comprises, responsive to the indicia being decoded when positioned outside of the 3D scan volume and also being decoded when positioned within the 3D scan volume, at least one of (i) cropping the 2D image data capturing the object bearing the indicia as it moves or remains stationary within the 3d scan volume, (ii) indicating to an indicia finder module to ignore 2D image data associated with the object when processing 2D image data capturing the object, or (iii) indicate to the decode module to ignore the 2D image data associated with the object when processing 2D image data capturing the object.

In another variation of this embodiment, the method further comprises the decoding operation including selecting an operating mode that defines the 3D scan volume.

In another embodiment, the present invention includes a non-transitory computer readable medium storing instructions, which when executed by a processor, are configured to cause the processor to capturing 2D image data over at least one 2D field of view (FOV) using a two-dimensional (2D) imaging assembly having at least one 2D imaging sensor. Additionally, these instructions cause the processor to capture depth data over at least one 3D FOV using a three-dimensional (3D) imaging assembly having at least one depth sensor and perform a decoding operation on an indicia appearing in the 2D image data and transmitting a payload of the indicia to a host when (i) the indicia is captured in the 2D image data and (ii) at least one of the indicia or an object bearing the indicia is positioned within a 3D scan volume, wherein the 3D scan volume is a portion of the 3D FOV that is defined by a predefined overlapping portion of the 2D FOV and at least one depth value.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
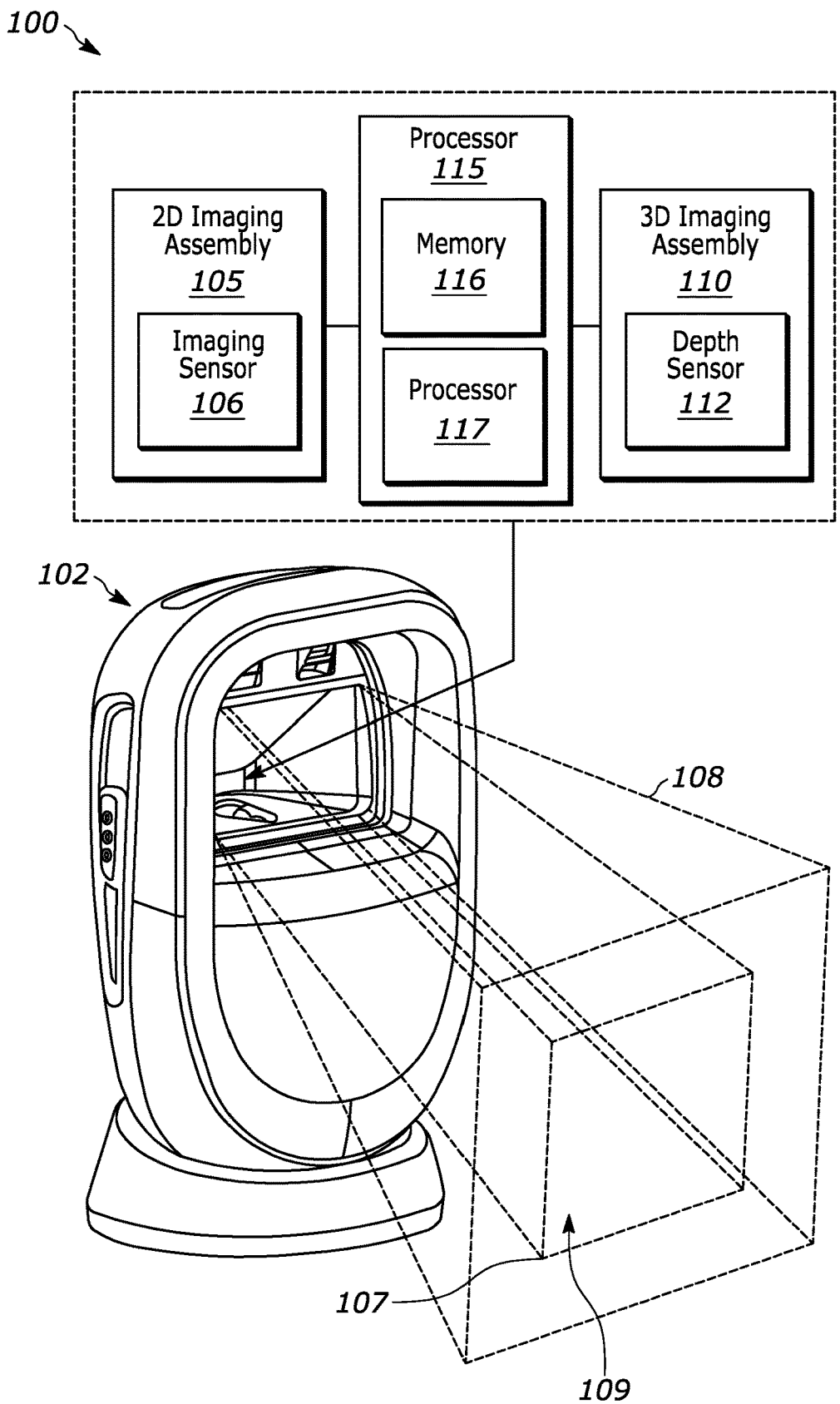
FIG. 1 illustrates an example indicia reading system of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Accidental, duplicate decoding of the payload of an indicia by an indicia reading system may result in longer checkout times and customer's being charged multiple times for the same product. Therefore, a system and method that allowed for the decoding of indicia only when the indicia or the object to which the indicia is affixed thereto is positioned within a given volume would be beneficial.

FIG. 1 illustrates an example indicia reading system 100 of the present invention. The indicia reading system 100 may include a two-dimensional (2D) imaging assembly 105 configured to capture 2D image data over at least one 2D field of view (FOV) 107. Although the 2D FOV 107 may be seen as extending indefinitely, the 2D imaging assembly 105 may have a working range over the 2D FOV 107 in which indicia captured in the 2D image data in the working range will likely have sufficient image quality for decoding operations performed on the indicia successfully.

The indicia reading system 100 may also include a three-dimensional (3D) imaging assembly 110 including at least one depth sensor 112, wherein the at least one depth senor 112 is configured to capture depth data, such as from 3D image data, over a at least one 3D FOV 108. The at least one depth sensor 112 may be a one of a direct time of flight sensor, an indirect time of flight sensor, a stereoscopic sensor, or a structured light sensor.

The indicia reading system 100 may also include a processor 115 configured to perform a decoding operation on an indicia appearing in the 2D image data and transmit a payload of the indicia to a host (not shown) when the indicia is captured in the 2D image data, i.e. the indicia appears in frames of 2D image data captured by the 2D imaging assembly 105, and at least one of the indicia or an object bearing the indicia is positioned within a 3D scan volume 109. For example, the indicia reading system 100 may be a barcode reading system in a retail environment. When a cashier presents an object bearing a barcode to the system 100 for reading, the 2D imaging assembly 105 may capture frames of 2D image data which contain the barcode. Additionally, the 3D imaging assembly 110 may capture depth data regarding to the position of the barcode and the object bearing the barcode. Accordingly, based on this depth data, the processor 115 may determine if at least one of the barcode or the object are positioned within the 3D scan volume 109. Responsive to this determination and the barcode appearing in the captured 2D image data, the processor may decode the barcode from the 2D information and transmit the payload data of the barcode to a host.

Accordingly, the 3D scan volume 109 may generally be within the working range of the 2D imaging assembly 105. The 3D scan volume 109 may also be a portion of the 3D FOV 108 that is defined by a predefined overlapping portion of the 2D FOV 107 and at least one depth value.

The indicia reading system 100 may further include a housing 102 configured to contain or support other components of the system 100 such as the 2D imaging assembly 105, the 3D imaging assembly 110, and the processor 115. The housing 102 may be configured to allow for hands-free and handheld modes of operation of the indicia reading system 100.

Figure 2:
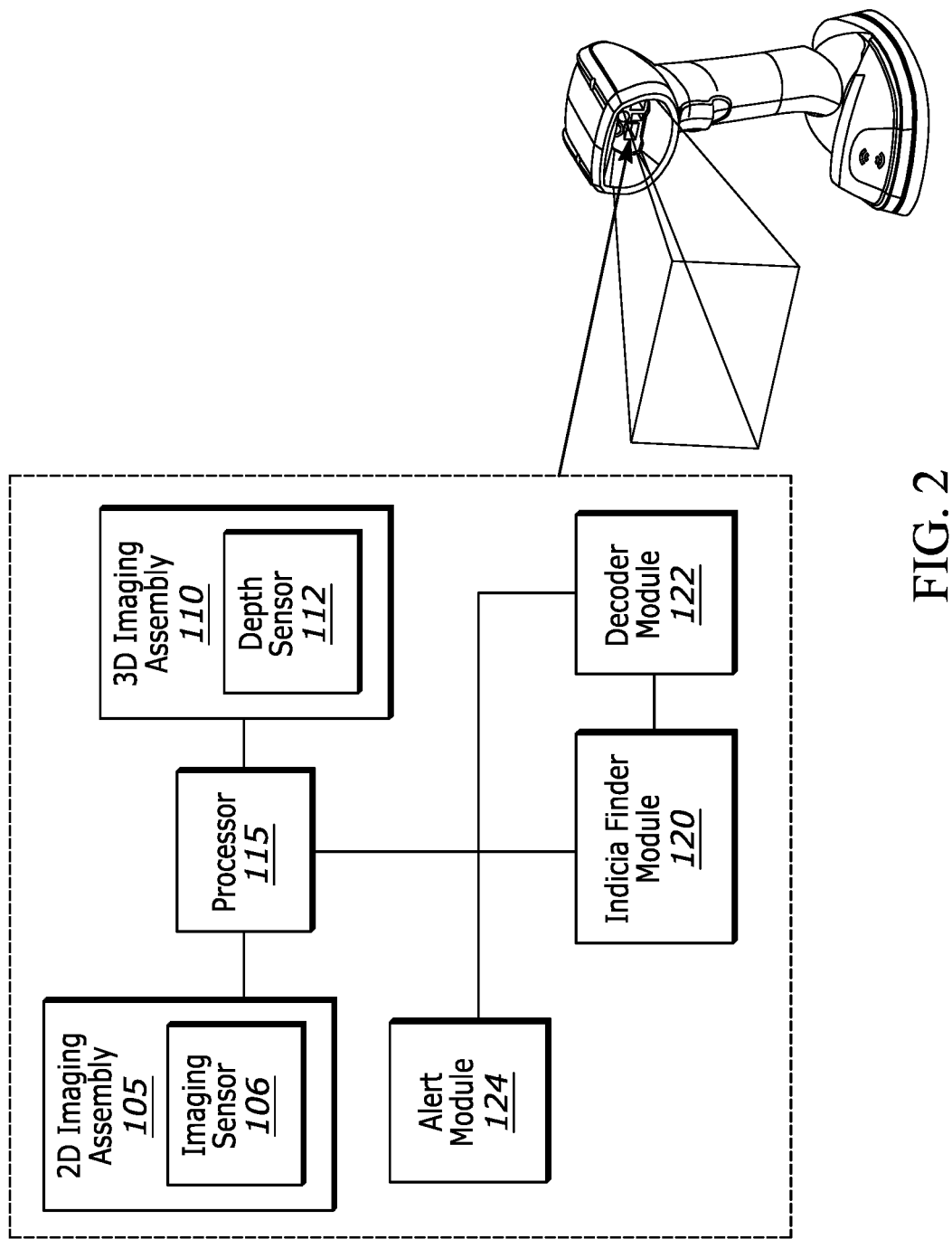
FIG. 2 illustrates an additional example indicia reading system of the present invention.

FIG. 2 illustrates an additional example indicia reading system 100 of the present invention. The indicia reading system 100 may also include at least one of an indicia-finder module, a decoder module, and an alert module. The decoding operating performed by the processor 115 may include processing the 2D image data which includes an indicia through an indicia finder module 120, which may be configured to identify coordinates associated with indicia affixed to objects and appearing in frames of the 2D image data. The indicia finder module 120 may use the identified coordinates to assist in identifying the quantity of indicia present in the 2D image data. The decoding operating performed by the processor 115 may also include processing the 2D image data through a decoder module 122. The decoder module 122 may be configured to decode the information encoded in the indicia captured in the 2D image data. The indicia finder module 120 may identify the presence of an indicia in the 2D image data and transmit it to the decoder module 122. The decoder module 122 may then decode the indicia identified by the indicia finder module 120, and the processor 115 may then transmit the decoded payload of the indicia to a host (not shown). In response to decoding and transmitting the payload, the processor 115 may generate a successful-decode alert signal, for example via alert module 124, which may provide a user of the system with at least one of visual and auditory indication of a successful indicia read.

The processor 115 may also be configured to determine the position of an object presented to the system based on the data from the 3D imaging assembly 110. The processor 115 may determine whether the object is positioned within the 3D scan volume 109. If the processor 115 determines an object is within the 3D scan volume 109, it may transmit the 2D image data capturing the object to the decoder module. The decoder module 122 may then decode the indicia identified by the indicia finder module 120, and the processor 115 may then transmit the decoded payload of the indicia to a host (not shown).

In response to determining that the object is positioned outside of the scan volume, the processor 151 may abstain from performing one task associated with the decoding operation. For example, the processor 115 may abstain from decoding the payload of the indicia. The processor 115 may also, if an object is determined to be outside of the 3D scan volume 109, fail to transmit the payload of the indicia to a host.

Figure 3A:
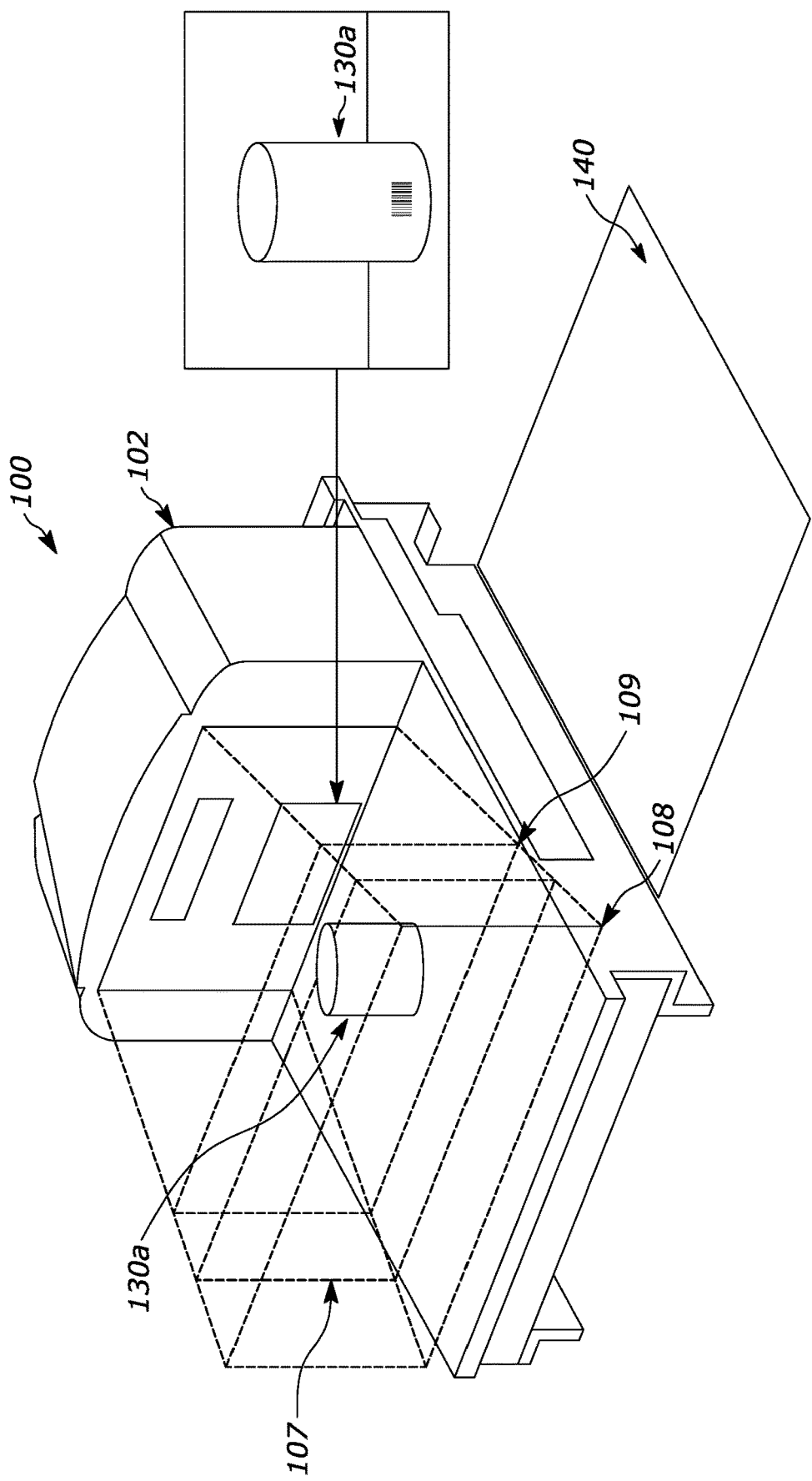
FIGS. 3a-d illustrate an additional example indicia reading system of the present invention in use over time.
Figure 3B:
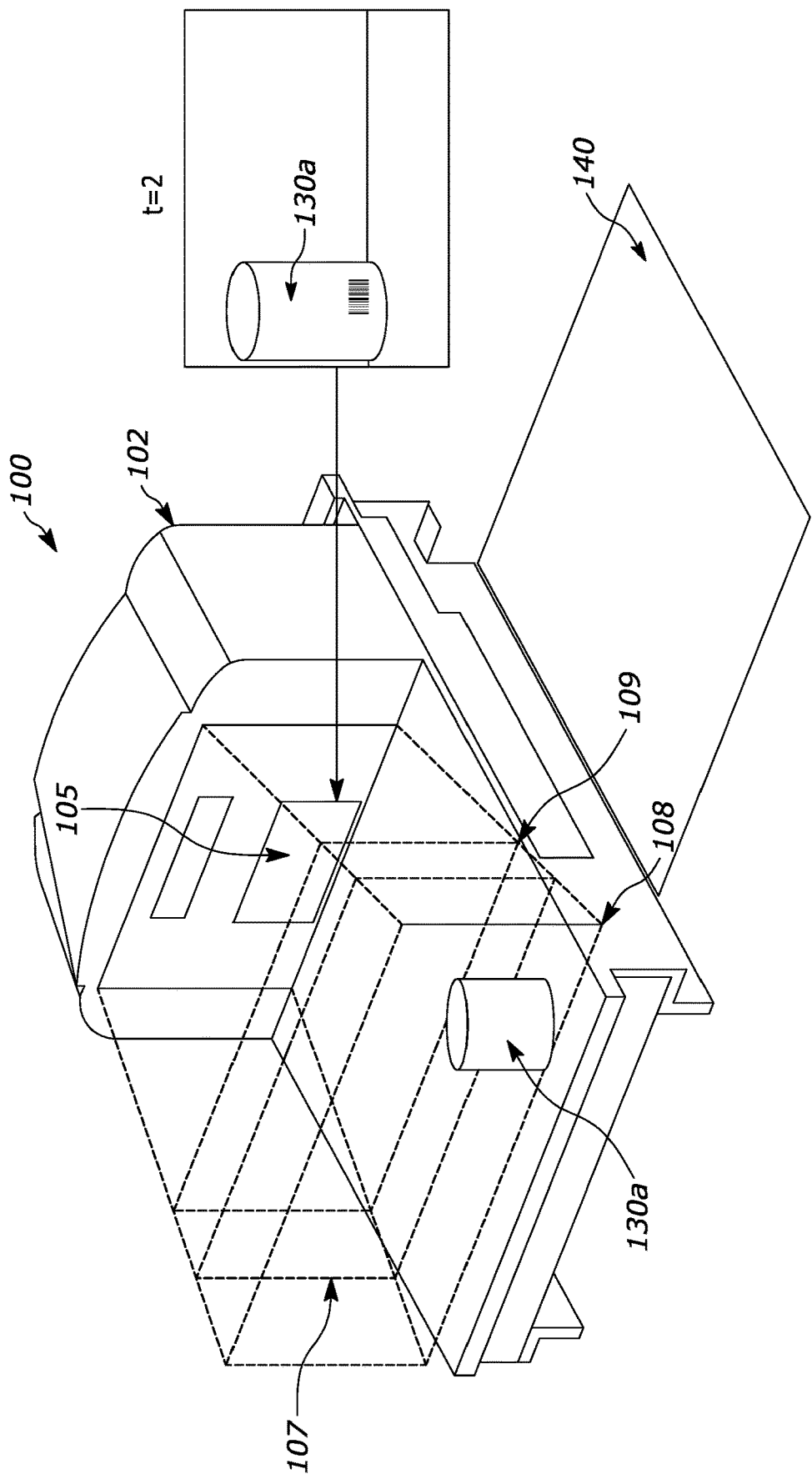
Figure 3C:
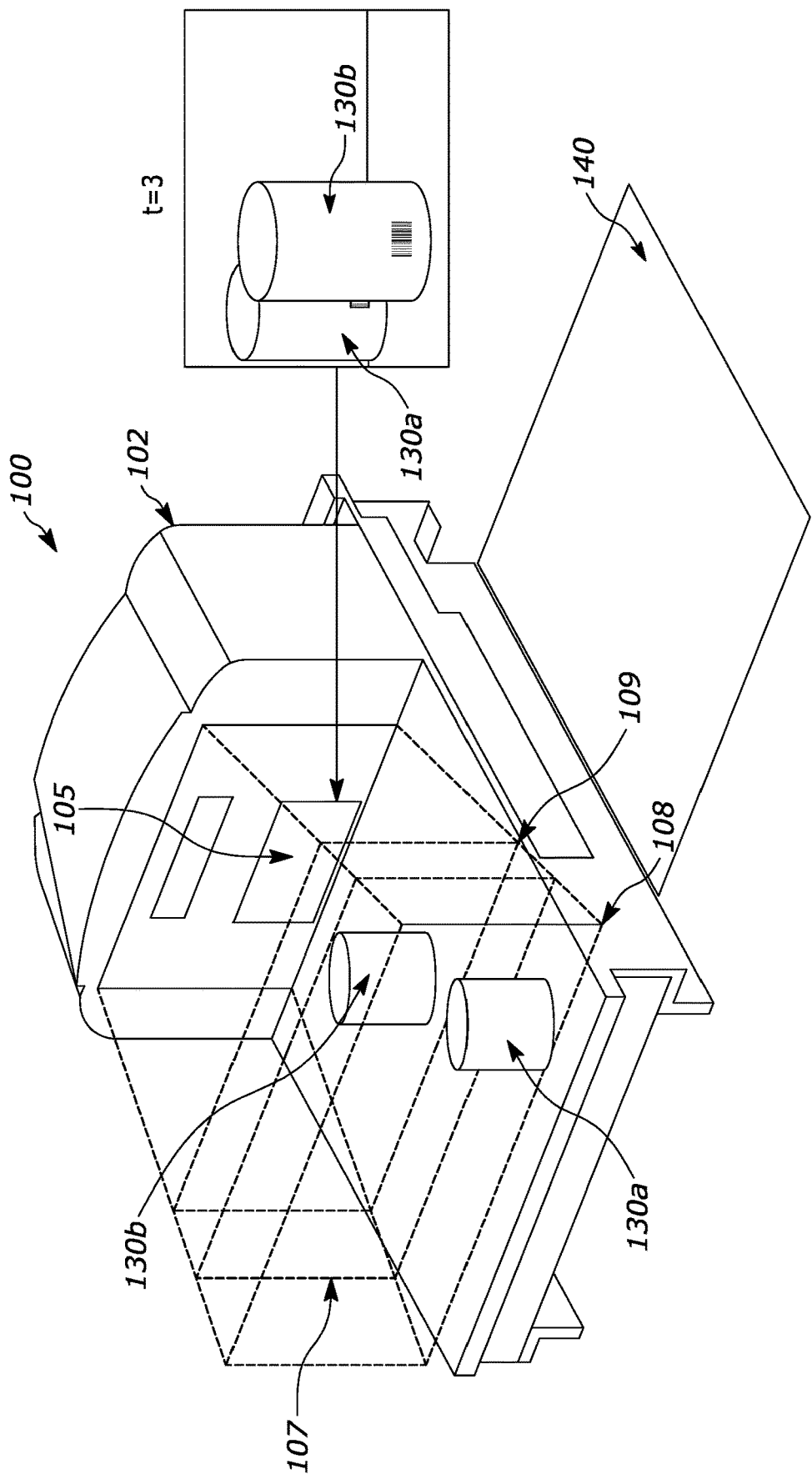
Figure 3D:
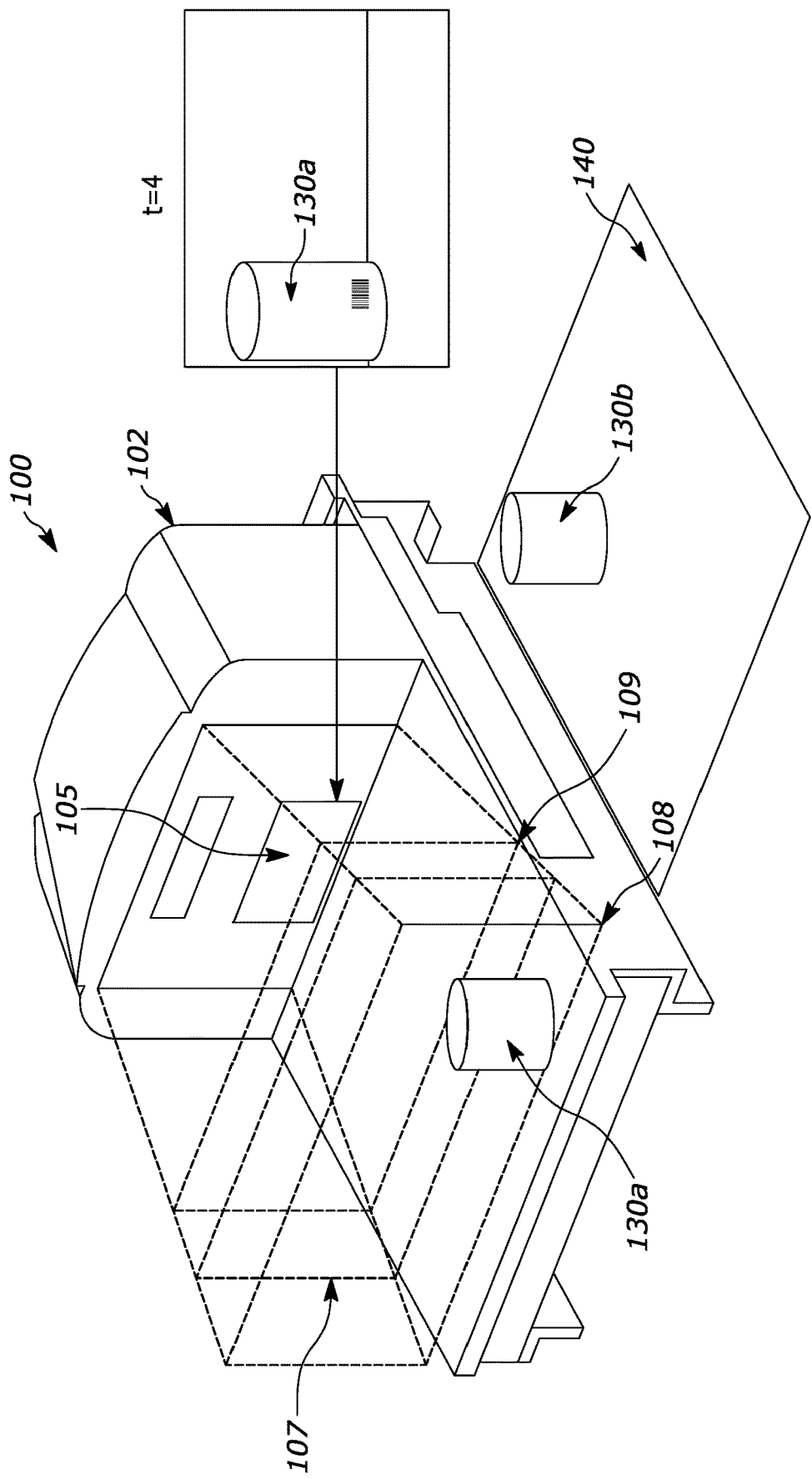

FIGS. 3*a-d* illustrate an example embodiment of the system of the present invention in use over time. FIGS. 3*a-d* further illustrate an example scenario in which several benefits of the present invention may be felt. For example, in a retail self-checkout environment, a customer may present a can bearing an indicia, e.g. a barcode, to an indicia reading system 100 during checkout. As shown in FIG. 3*a*, at t=1, a customer may position a can 130*a* bearing an indicia in front of the 2D imaging assembly 105 of the system 100. Next at t=2, depicted in FIG. 3B, the customer may move the can 130*a* away from the imagining assembly 105 but not fully remove it from the housing 102 of the system, for example, to a bagging area 140. At t=3 shown in FIG. 3*c*, the customer may then move a second can 130*b* in front of the 2D imaging assembly 105 of the system such that the first can 130*a* is blocked from the 2D imaging assembly 105. FIG. 3D shows at t=4, the second can 130*b* has been moved from the system and to a bagging area 140, while the first can 130*a* remains on the housing 102 of the indicia reading system 100. A conventional indicia reading system in this scenario may read the indicia of the first can 130*a* at t=1, read the indicia of the second can 130*b* at t=3, and read the indicia of the first can 130*a* again at t=4 once the second can 130*b* no longer blocks the indicia of the first can from the 2D imaging assembly 105. An example embodiment of present invention may prevent such unintentional, duplicate readings of the same indicia.

In an example embodiment, the processor 115 may be configured to at least one of abstain from performing at least one task associated with the decoding operation or abstain from transmitting the payload of the indicia to the host when the indicia is captured in the 2D image data and at least one of the indicia or the object bearing the indicia is positioned outside the 3D scan volume 109. For example, at t=1, a user may place a first can 130*a* such that it is positioned within the 3D scan volume 109. The 2D imaging assembly 105 may capture the indicia affixed to can 130*a* in the 2D image data, and the 3D imaging assembly 110 may capture depth data related to the indicia affixed to can 130*a*. In response to the indicia affixed to can 130*a* appearing in the 2D image data captured by the at least one imaging sensor 106 of the imaging assembly 105 and can 130*a* or the indicia being positioned within the 3D scan volume 109, the processor 115 may perform a decoding operation, such as decoding the information encoded in the indicia affixed to can 130*a* or processing the 2D data including the indicia through a decoder module. The processor 115 may also transmit the payload of the indicia to a host, such as a retail POS system.

At t=2, as depicted in FIG. 3*b*, the user may move can 130*a* out of the 3D scan volume 109. The indicia reading system may generally be configured to prevent the reader from decoding the same indicium within a specified time interval, a parameter known as same-symbol timeout. At t=2, the processor 115 may experience a same-symbol timeout error which prevents it from performing a decoding operation on the indicia affixed to can 130*a*.

At t=3, as depicted in FIG. 3*c*, the user may present can 130*b* to the indicia reading system and position can 130*b* within the 3D scan volume 109, while can 130*a* remains stationary on the housing, blocked from the imaging assembly 105 by can 130*b*. In response to the indicia affixed to can 130*b* appearing in the 2D image data captured by the at least one imaging sensor of the imaging assembly and can 130*b* or the indicia being positioned within the 3D scan volume 109, the processor 115 may perform a decoding operation, such as decoding the information encoded in the indicia affixed to can 130*b* or processing the 2D data including the indicia through a decoder module. The processor 115 may also transmit the payload of the indicia affixed to can 130*b* to a host.

At t=4, as depicted in FIG. 3*d*, the user may move can 130*b* to a bagging area. Can 130*a* may remain on the housing of the indicia reading system within the working range of the 2D imaging assembly 105 and the 3D imaging assembly 110. However, while the indicia affixed to can 130*a* may appear in the 2D image data at t=4, the processor 115 may be configured to abstain from performing at least one task associated with the decoding operation or abstain from transmitting the payload of the indicia to the host as the indicia/can 130*a* is positioned outside of the 3D scan volume 109. In this manner, the indicia reading system may prevent unintentional or duplicative scan of objects like can 130*a*. This advantage of this example of the present invention may be felt in checkout or self-checkout scenarios involving a cashier or customer having limited amounts of counter space. Additionally, indicia reading systems that comprise a 2D imaging assembly 105 with a very wide 2D FOV may also benefit from this aspect of the present invention in preventing unintentional, duplicative decodes of indicia payload from objects that users may not expect to be in view of the system, for example a user may not move an object far enough away from the system to actually move the object from the 2D FOV.

In another example, the processor 115 of the system may be configured to determine if an object is positioned within the 3D scan volume 109. Responsive to the object being positioned within the 3D scan volume 109, the processor 115 may transmit the 2D image data to a decoder module. The decoder module may decode the information encoded in the indicia captured in the 2D image data, and the processor 115 may transmit the payload of the indicia to a host.

The processor 115 may also determine if an object is positioned outside the 3D scan volume 109. Responsive to the object being positioned outside the 3D scan volume 109, the processor 115 may abstain from performing at least one task associated with the decoding operation. The processor 115 may also abstain from transmitting the payload of the indicia to the host.

In response to processor 115 determining the object is positioned outside the 3D scan volume 109, the processor 115 may crop the 2D image data capturing the object to exclude at least a portion of the object, for example a portion of the indicia affixed to the object. For example, as depicted in FIG. 3*b*, at t=2, the processor 115 may determine that can 130*a* is positioned outside the scan volume and crop the 2D image data capturing can 130*a* to exclude can 130*a*. In this manner, regardless of same-symbol timeout, the processor 115 may not perform a decoding operation on the indicia on can 130*a* as it is removed from the 2D image. At t=4, depicted in FIG. 3*d*, after a user removed can 130*b* from the system, the processor 115 may once again determine that can 130*a* is positioned outside the scan volume and crop the 2D image data capturing can 130*a* to exclude can 130*a*. In this manner, at t=4, the system is prevented from erroneously performing a decoding operation on the indicia on can 130*a* for a second time. In a retail setting, this would prevent the user of the system from being mistakenly charged twice for the same item.

In response to processor 115 determining the object is positioned outside the 3D scan volume 109, the processor 115 may perform a decoding operation on the indicia affixed to the object and appearing in the 2D image data and may also transmit the payload of the indicia to the host with a flag. The flag may be any suitable notification to the host. Based on receiving a payload with a flag, the host may generate a log file detailing the indicia related to the flag or the host may not process the payload data with the flag as being read by the system.

In response to processor 115 determining the object is positioned outside the 3D scan volume 109, the processor 115 may also process the 2D image data capturing the object with an instruction to ignore a subset of the 2D image data containing at least one of the object or the indicia. For example, when performing a decoding operation on the 2D image data, if the processor 115 encounters an instruction to ignore, the processor 115 may skip processing and performing decoding operations on the frames related to the instruction, i.e. containing an object/indicia outside of the 3D scan volume 109.

In another example, the processor 115 may determine that an object is positioned outside the 3D scan volume 109. Responsive to the indicia affixed to the object being decoded while outside the 3D scan volume 109 and not within the 3D scan volume 109, the processor 115 may be configured to transmit the payload data of the indicia to the host. For example, a customer may present an object bearing indicia to an indicia reading system; however, the customer may not move the object close enough to the system such that it is positioned in the 3D scan volume 109. The processor 115, based on the depth data from the 3D imaging assembly 110, may determine that as the indicia never entered the 3D scan volume 109 and the customer intends for the system to read the indicia, the system 100 needs to read the indicia and transmit the payload of the indicia to the host.

In another example, responsive to the indicia being decoded when positioned outside of the 3D scan volume 109 and also being decoded when positioned within the 3D scan volume 109, the processor 115 may transmit only one instance of the payload data of the indicia to the host. The processor 115 may also crop the 2D image data capturing the object bearing the indicia as it moves or remains stationary within the 3D scan volume 109.

Figure 4:
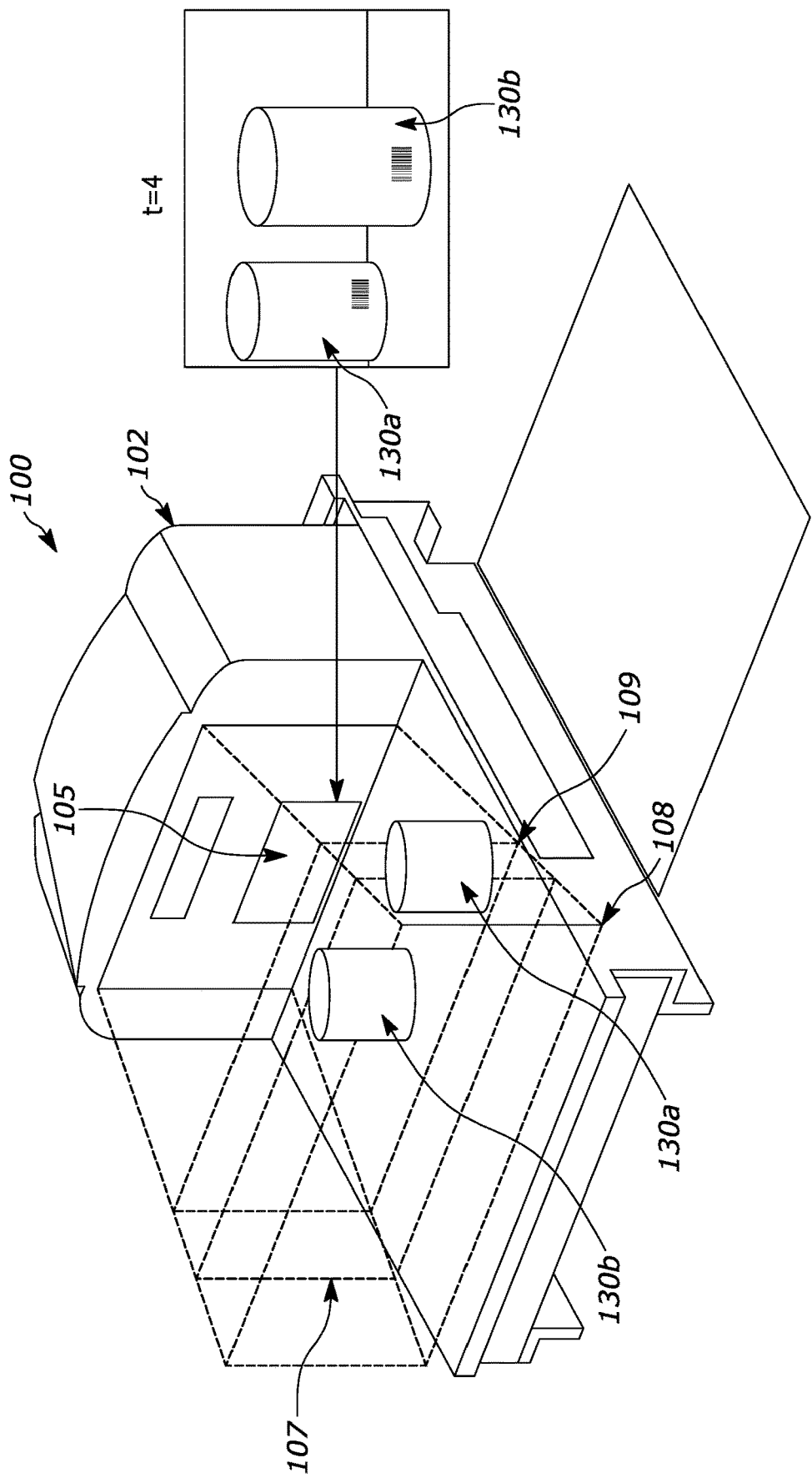
FIG. 4 illustrates an additional example indicia reading system, of the present invention.

FIG. 4 illustrates an additional example indicia reading system of the present invention. Responsive to the indicia being decoded when positioned outside of the 3D scan volume and also being decoded when positioned within the 3D scan volume, the processor 115 may crop the 2D image data capturing the object bearing the indicia as it moves or remains stationary within the 3d scan volume. For example, can 130*a* may have been decoded when positioned outside of the 3D scan volume and also been decoded when positioned within the 3D scan volume. A user may then not remove can 130*a* from the scan volume and then present can 130*b* to the system for reading. The processor 115 may crop out can 130*a* from the 2D image data in order to prevent the indicia from being decoded again and to prevent duplicate read.

In another example, the processor 115 may indicate to an indicia finder module to ignore 2D image data associated with an object when processing 2D image data capturing the object, in response to the indicia being decoded when positioned outside of the 3D scan volume 109 and also being decoded when positioned within the 3D scan volume 109. For example, the processor 115 may indicate to the indicia finder module 120 to skip processing frames of the 2D image data associated with can 130*a*, i.e. the indicia finder module 120 may skip searching these frames or portions of these frames for the presence of an indicia in response to the indication from the processor 115.

In another example, the processor 115 may also indicate to the decoder module 122 to ignore the 2D image data associated with the object when processing 2D image data capturing the object. For example, the processor 115 may indicate to the decoder module 122 to skip processing frames of the 2D image data associated with can 130a, i.e. the decoder 122 may skip attempting to decode the indicia appearing in these frames or portions of these frames.

In another example, the housing of the indicia reading system 100 may be configured to be positioned on a workstation having a surface extending along a surface plane such that at least a portion of the housing extends above the surface. Additionally, a central imaging axis of at least one of the at least one of the 2D FOV may extend between parallel and 45 degrees relative to the surface plane, and a central imaging axis of the at least one of the at least one of the 3D FOV may extend between parallel and 45 degrees relative to the surface plane. Also, a lateral extent of the 3D FOV may be less than a lateral extent of the 2D FOV.

Figure 5:
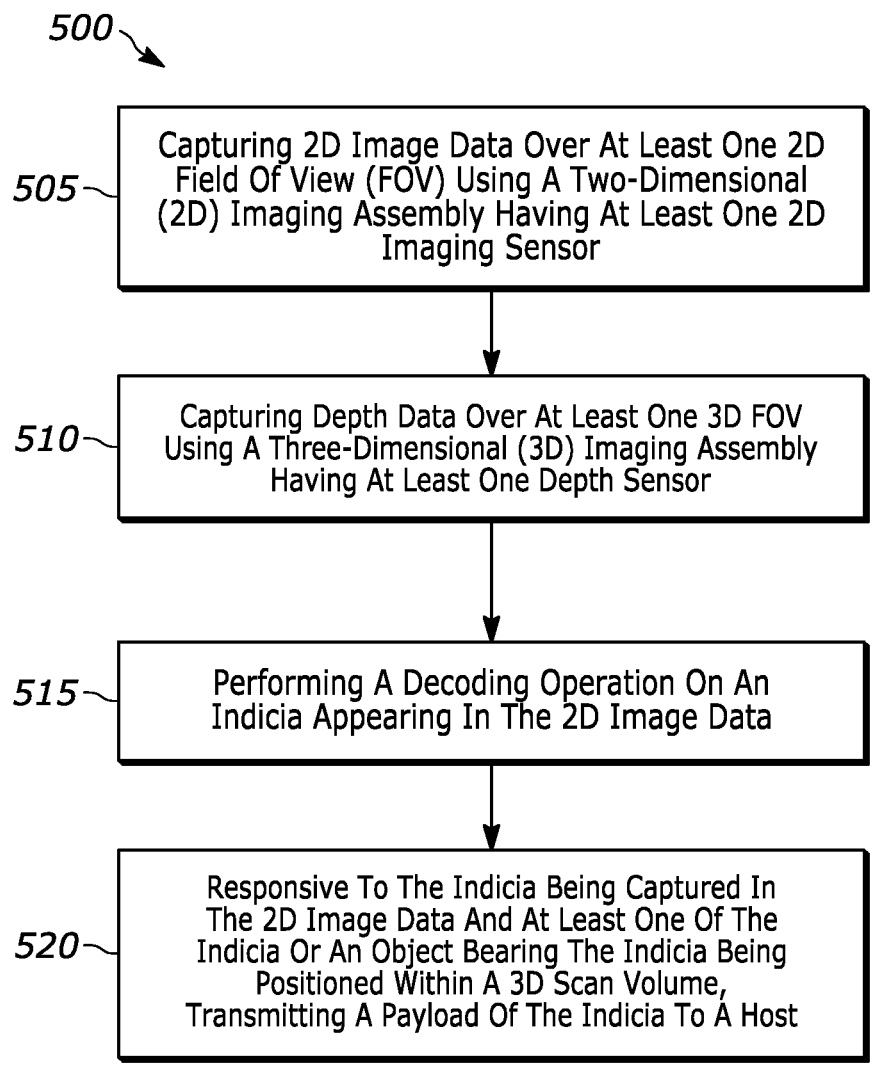
FIG. 5 a flowchart illustrating an example method of indicia reading of the present invention.

FIG. 5 is a block flowchart illustrating a method for decoding indicia within a scan volume. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In example method 500, 2D image data is captured using a 2D imaging assembly 105 including at least one imaging sensor 106 (block 505). For example, the imaging assembly 105 may include an image sensor 106, such as a 2D camera, to capture frames of the environment appearing in the 2D FOV 107, such as at a retail self-checkout counter. Example method 500 also includes capturing 3D image data or depth data of an environment appearing in a 3D FOV 108 using a 3D imaging assembly 110 including at least one depth sensor 112 (block 510). For example, a time of flight sensor may be used to collect 3D image and depth data regarding objects appearing in the second FOV 108.

Also example method 500 includes performing a decoding operation on an indicia appearing in the 2D image data and, in response to the indicia being captured in the 2D image data and at least one of the indicia or an object bearing the indicia being positioned within a 3D scan volume 109, transmitting a payload of the indicia to a host (block 515 and 520). For example, a processor 115, based on the depth data from the 3D imaging assembly 110, may determine if an object bearing indicia is positioned within the 3D scan volume 109 and transmit the payload of the indicia to a POS host system.

Figure 6:
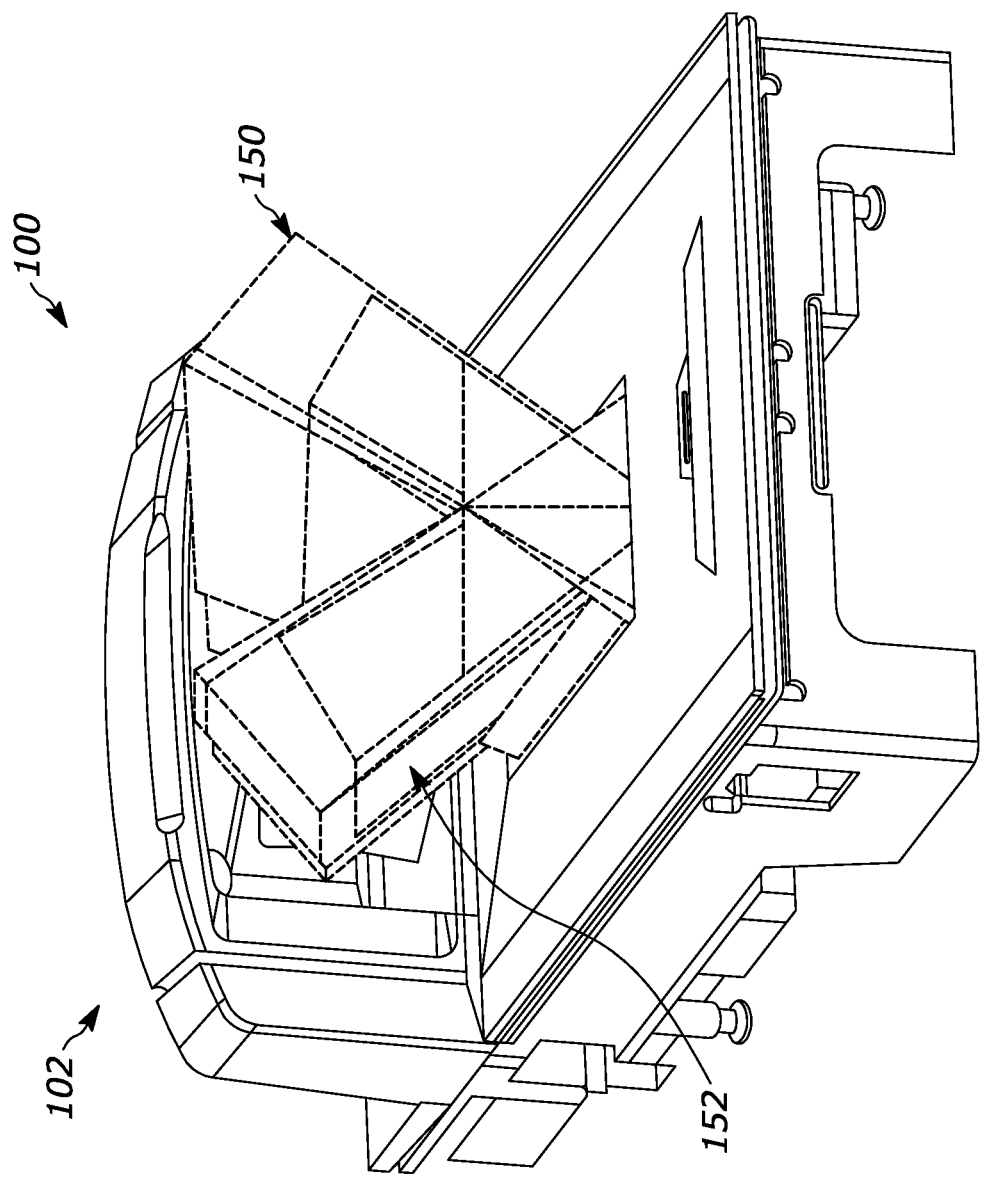
FIG. 6 illustrates an additional example indicia reading system, of the present invention.

FIG. 6 illustrates an additional example of the present invention. The indicia reading system may be configured to include a bi-optic scanner, which may include an imaging assembly with a plurality of image sensors and a plurality of 2D fields of view. The indicia reading device may include a first 2D FOV 150 and a second 2D FOV 152, which are substantially vertical.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reading system comprising:
   a two-dimensional (2D) imaging assembly having at least one 2D imaging sensor and operable to capture 2D image data over at least one 2D field of view (FOV);
   a three-dimensional (3D) imaging assembly having at least one depth sensor and operable to capture depth data over at least one 3D FOV;
   a processor configured to:
      perform a decoding operation on an indicia appearing in the 2D image data and transmit a payload of the indicia to a host when (i) the indicia is captured in the 2D image data and (ii) at least one of the indicia or an object bearing the indicia is positioned within a 3D scan volume; and
   a housing configured to be positioned on a workstation having a surface extending along a surface plane such that at least a portion of the housing extends above the surface, wherein:
   a central imaging axis of at least one of the at least one of the 2D FOV extends between parallel and 45 degrees relative to the surface plane;
   a central imaging axis of the at least one of the at least one of the 3D FOV extends between parallel and 45 degrees relative to the surface plane; and
   a lateral extent of the 3D FOV is less than a lateral extent of the 2D FOV.

2. The indicia reading system of claim 1, wherein the 3D scan volume is a portion of the 3D FOV that is defined by a predefined overlapping portion of the 2D FOV and at least one depth value.

3. The indicia reading system of claim 1, wherein the processor is further configured to at least one of abstain from performing at least one task associated with the decoding operation or abstain from transmitting the payload of the indicia to the host when (i) the indicia is captured in the 2D image data and (ii) at least one of the indicia or the object bearing the indicia is positioned outside the 3D scan volume.

4. The indicia reading system of claim 1, wherein the decoding operation includes at least one of (i) processing the 2D data including the indicia through an indicia finder module, (ii) processing the 2D data including the indicia through a decoder module, or (iii) generating a successful-decode alert signal.

5. The system of claim 1, wherein the processor is further configured to:
   determine if the object is positioned within the 3D scan volume; and
   responsive to the object being positioned within the 3D scan volume, transmitting the 2D image data to a decode module.

6. The system of claim 5, wherein the processor is further configured to, responsive to the object being positioned outside the 3D scan volume, of at least one of (i) abstain from performing at least one task associated with the decoding operation, (ii) abstain from transmitting the payload of the indicia to the host, (iii) cropping the 2D image to exclude at least a portion of the object, (iv) transmit the payload of the indicia to the host with a flag, or (v) process the 2D image data capturing the object with an instruction to ignore a subset of the 2D image data containing at least one of the object or the indicia.

7. The system of claim 5, wherein the processor is further configured to, responsive to the indicia being decoded when positioned outside of the 3D scan volume and not when positioned within the 3D scan volume, abstain from transmitting the payload data of the indicia to the host.

8. The system of claim 5, wherein the processor is further configured to, responsive to the indicia being decoded when positioned outside of the 3D scan volume and also being decoded when positioned within the 3D scan volume, transmit one instance of the payload data of the indicia to the host.

9. The system of claim 8, wherein, responsive to the indicia being decoded when positioned outside of the 3D scan volume and also being decoded when positioned within the 3D scan volume, at least one of (i) cropping the 2D image data capturing the object bearing the indicia as it moves or remains stationary within the 3d scan volume, (ii) indicating to an indicia finder module to ignore 2D image data associated with the object when processing 2D image data capturing the object, or (iii) indicate to the decode module to ignore the 2D image data associated with the object when processing 2D image data capturing the object.

10. The system of claim 1, wherein the decoding operation includes selecting an operating mode that defines the 3D scan volume.

11. A method of indicia reading comprising:
capturing 2D image data over at least one 2D field of view (FOV) using a two-dimensional (2D) imaging assembly having at least one 2D imaging sensor;
capturing depth data over at least one 3D FOV using a three-dimensional (3D) imaging assembly having at least one depth sensor;
performing a decoding operation on an indicia appearing in the 2D image data and transmitting a payload of the indicia to a host when (i) the indicia is captured in the 2D image data and (ii) at least one of the indicia or an object bearing the indicia is positioned within a 3D scan volume, wherein the 3D scan volume is a portion of the 3D FOV that is defined by a predefined overlapping portion of the 2D FOV and at least one depth value;
determining if the object is positioned within the 3D scan volume;
responsive to the object being positioned within the 3D scan volume, transmitting the 2D image data to a decode module; and
responsive to the indicia being decoded when positioned outside of the 3D scan volume and also being decoded when positioned within the 3D scan volume, transmitting one instance of the payload data of the indicia to the host.

12. The method of claim 11, further comprising at least one of abstaining from performing at least one task associated with the decoding operation or abstaining from transmitting the payload of the indicia to the host when (i) the indicia is captured in the 2D image data and (ii) at least one of the indicia or the object bearing the indicia is positioned outside the 3D scan volume.

13. The method of claim 11, wherein the decoding operation includes at least one of (i) processing the 2D data including the indicia through an indicia finder module, (ii) processing the 2D data including the indicia through a decode module, or (iii) generating a successful-decode alert signal.

14. The indicia reading method of claim 11, the method further comprising, responsive to the indicia being decoded when positioned outside of the 3D scan volume and not when positioned within the 3D scan volume, abstaining from transmitting the payload data of the indicia to the host.

15. The indicia reading method of claim 11, further comprising, responsive to the indicia being decoded when positioned outside of the 3D scan volume and also being decoded when positioned within the 3D scan volume, at least one of (i) cropping the 2D image data capturing the object bearing the indicia as it moves or remains stationary within the 3d scan volume, (ii) indicating to an indicia finder module to ignore 2D image data associated with the object when processing 2D image data capturing the object, or (iii) indicating to the decode module to ignore the 2D image data associated with the object when processing 2D image data capturing the object.

16. The method of claim 11, wherein the method further comprises, responsive to the object being positioned outside the 3D scan volume, at least one of (i) abstaining from performing at least one task associated with the decoding operation, (ii) abstaining from transmitting the payload of the indicia to the host, (iii) cropping the 2D image to exclude at least a portion of the object, (iv) transmitting the payload of the indicia to the host with a flag, or (v) processing the 2D image data capturing the object with an instruction to ignore a subset of the 2D image data containing at least one of the object or the indicia.

* * * * *